United States Patent [19]

Ushakoff

[11] 3,718,436

[45] Feb. 27, 1973

[54] IMMUNO DIFFUSION CELL

[75] Inventor: Alexis E. Ushakoff, Plantation, Fla.

[73] Assignee: Cordis Corporation, Miami, Fla.

[22] Filed: Nov. 11, 1971

[21] Appl. No.: 197,818

[52] U.S. Cl. .................................23/253 R, 195/139
[51] Int. Cl. .....C12k 1/10, G01n 31/02, G01n 33/16
[58] Field of Search .........23/253 R, 230 B; 195/139, 103.5

[56] References Cited

UNITED STATES PATENTS 3,554,704 1/1971 Ushakoff..........................23/230 B X

*Primary Examiner*—Morris O. Wolk
*Assistant Examiner*—R. M. Reese
*Attorney*—L. William Bertelsen

[57] ABSTRACT

A two-directional immuno diffusion (ouchterlony) cell features a gel layer and an overlying template having wells for the reactants. One of the wells is in the form of an enclosed peripheral channel and the other is eccentric, such that diffusion of the respective reactants from the wells results in an elliptical reaction figure, the geometry and rate of formation of which are functions of the reactant concentrations and relative proportions.

2 Claims, 6 Drawing Figures

INVENTOR
ALEXIS E. USHAKOFF
BY Kenway, Jenney & Hildreth
ATTORNEYS

INVENTOR.
ALEXIS E. USHAKOFF
BY Kenway, Jenney & Hildreth
ATTORNEYS

IMMUNO DIFFUSION CELL

DISCLOSURE — BACKGROUND

This invention relates to biochemical analysis, and resides in a device for carrying out two directional immuno diffusion techniques by the ouchterlony method.

In two directional ouchterlony techniques, two precipitate-forming reactants, an antibody and an antigen, in solution are allowed to diffuse together in a gel layer. Where they meet in sufficient concentration, a visible precipitate forms which provides information regarding the composition of the samples. The method can be used quantitatively, by comparison of the precipitate zones formed from varying dilutions of both known and unknown samples of one reactant, which are caused to diffuse against a sample of the other reactant, such that the unknown sample may be compared and matched up with a known sample.

For general discussion of a cell of this type, reference is made to my U.S. Pat. No. 3,554,704.

In the ouchterlony techniques to which this invention relates measurements will made of the location of the precipitate with reference to the location of the places where the two reactants are introduced into the gel layer.

GENERAL DESCRIPTION

The object of this invention is to provide an ouchterlony cell and technique which will yield easily measured precipitate patterns having dimensions which reflect both the relative proportions and the concentrations of the two reactants.

I have discovered that if one of the reactants is contacted with the gel layer in a narrow annular region and the other in a small circular well area within and eccentric of the annulus, the precipitate forms as a crescent, initially between the well and annulus where they are closest, and grows until the points of the crescent meet to form an ellipse. The dimensions of the ellipse and the time required for its formation, are functions of the relative proportion of the reactants and their concentrations.

Accordingly, the ouchterlony cell of this invention comprises a flat bottomed pan which contains a gel layer which supports a template having appropriate wells or reservoirs for containing the two reactant solutions. One of these is in the form of an annular channel on the bottom of the template, and the other is small well, or recess within and eccentric of the annular channel. Passages through the template may communicate with the channel and recess to permit the introduction of reactant solution and the removal of air. The channel and recess serve to confine the reactants to contact the gel surface in limited locations such that the characteristic geometry of the precipitate zone may be developed and measured.

DETAILED DESCRIPTION

The preferred embodiment of the micro ouchterlony cell of this invention is described in detail below and is illustrated in the accompanying drawings in which.

Figure 3A:
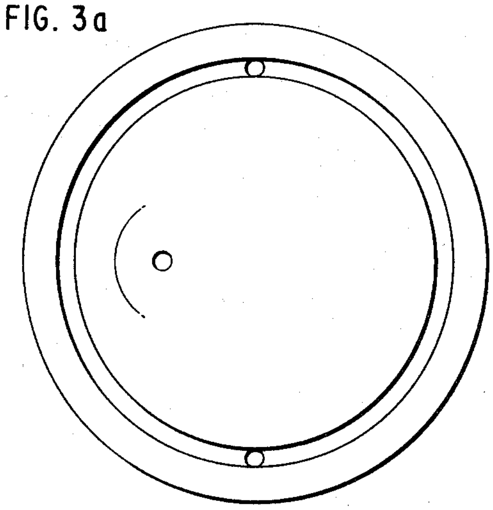
Figure 3C:
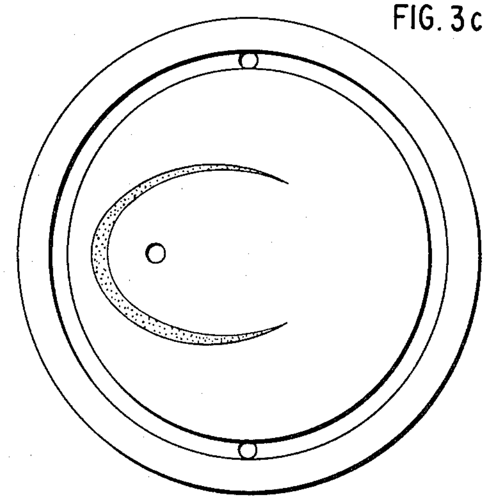
Figure 3B:
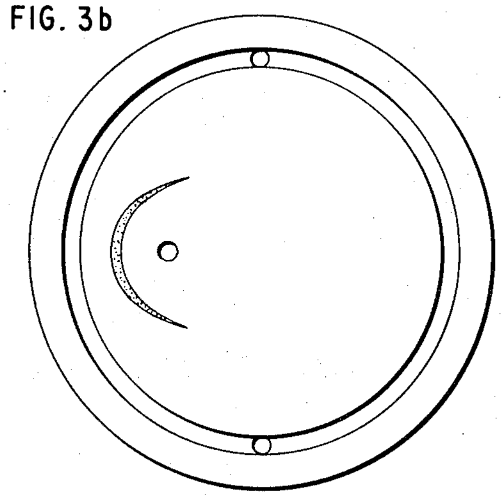

FIGS. 3*a*, *b*, *c* and *d* are plan views showing the progessive formation of a precipitant figure developing through the diffusion of the reactants toward each other from the outer peripheral channel and the inner eccentric recess.

Figure 1:
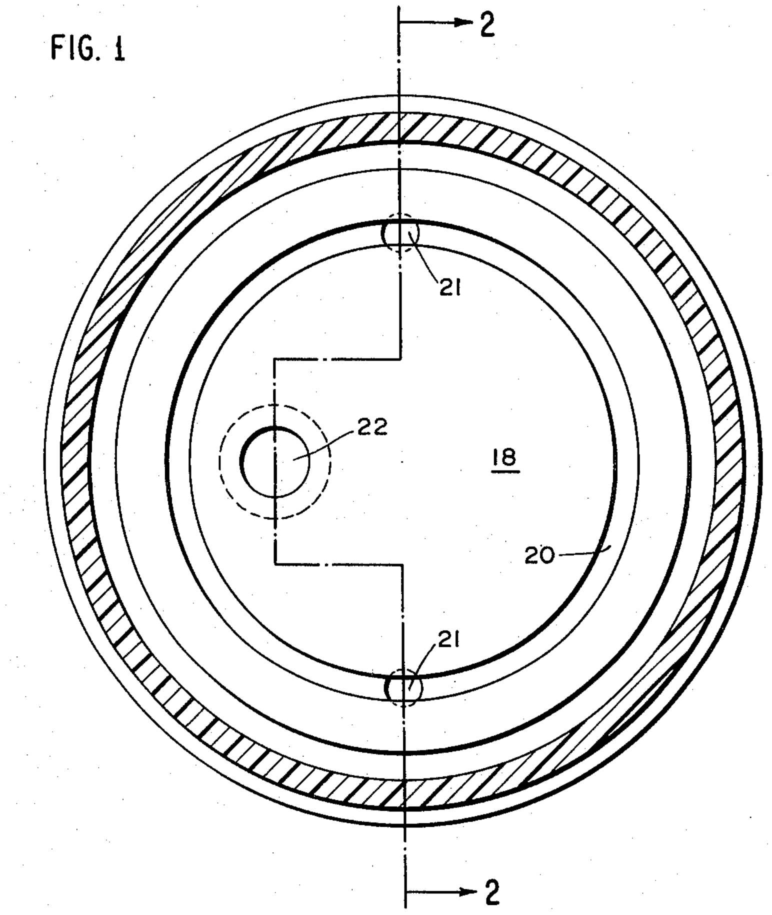
FIG. 1 is a bottom plan view of the template which defines the ouchterlony cell of this invention taken at 1—1 of FIG 2.
Figure 2:
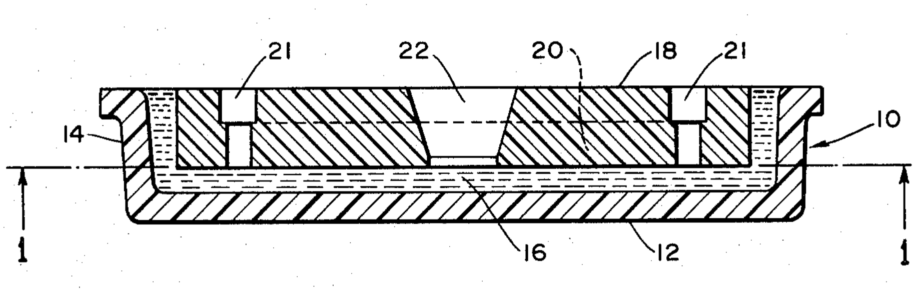
FIG. 2 is an elevation taken at section 2—2 of the cell shown in FIG 1.

As will be seen form FIGS. 1 and 2 the cell is formed within a generally dish shaped base member 10 having a flat bottom 12 surrounded by an upstanding wall 14. The base member is preferably of transparent plastic and may be the base described in my U.S. Pat. No. 3,554,704.

The base 10 supports a gel film 16 on which a template 18 of transparent plastic is positioned.

The underside of the template is formed with an outer annular channel 20 to which openings 21 lead through the template. These openings 21 serve as feed and vent connections to the channel 20 for one of the reactants. Within the channel 20 and eccentric of it is a recess formed as a well 22 opening to the lower surface of the template, and opening also to the upper surface of the template to permit introduction of the other reactant.

In use, one of the reactants in the immuno diffusion reaction is introduced into the outer channel 20 through one of the openings 21 (the other serving as a vent) and the other is is introduced into the central well 22. Each is thereby placed in contact with the gel layer and will migrate through it until they come together to react and form a visible precipitate in a characteristic pattern as illustrated in FIG. 3*a*–3*d*. Precipitate initially forms where the peripheral channel and well are closest, see FIG. 3*c*, the precipitate grows outwardly as a crescent, see FIG. 3*b* and *c*, and the leading edges grow together eventually forming the ellipse illustrated in FIG. 3*d*.

In assembling a cell of the type described above, it is convenient to first cast a hot aqueous agar solution to the thickness of the gel film 16 in the bottom of the base member 10, then cool it to harden. Thereafter the template 18 may be placed upon the gel layer, and if desired the surrounding space between the template and wall 14 may be filled with agar solution and gelled.

It should be noted that the reactant solutions in the cell herein described are contained in wells of defined volume, such that, when they are filled, predetermined amounts of reactant solutions are present. The fixed volume of the wells, that is to say the channel 20 and recess 22, eliminate the need of accurate pipetting when the reactant solutions are introduced, as the volume of these wells determines the amount of solution in each case.

It has been found that a precipitate figure highly responsive to concentration-ratio variations is developed when the eccentric inner recess is situated about ¼ radius of the peripheral channel inwardly from the channel. As noted above the size of the precipitate figure is dependent upon the ratio of the concentrations of reacting components, that is to say the dimension $x$ in FIG. 3*d* can be taken as a convenient measurement of size and correlated with the concentration ratio of the two reactants. A calibration curve can be plotted in accordance with well known analytical techniques such that one known reactant is caused to react with varying concentrations of the other reactant. The sensitivity of the technique herein described is sufficiently high to cover at least ten 2-fold dilutions of one of the interreacting components.

Figure 3D:
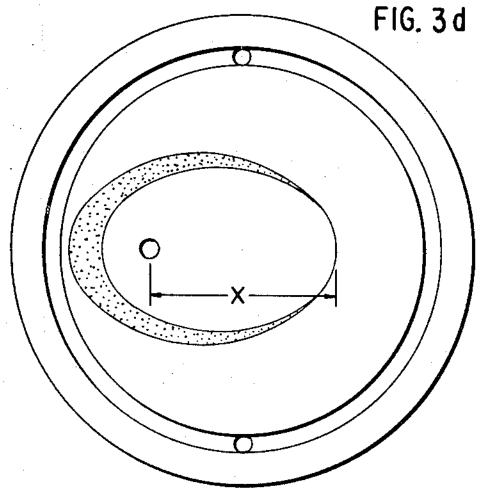

As also noted above the time that it takes the figure to complete, that is to say for the elipse to close as illustrated in FIG. 3*d*, is dependent upon the total concentration and on the size of the plate itself. Whereas the plate having an outer peripheral well ¾ of an inch in diameter will under given conditions develop down to the tenth 2-fold dilution in approximately thirty hours; a ¼ inch peripheral well will produce the figure in about five hours and a ⅛ inch peripheral well in about one hour.

From the foregoing description it should be seen that this invention provides a micro ouchterlony technique useful for quantitative assay purposes to give reliable measurements of both total concentration and relative proportions of interreacting antigen antibody systems.

Having thus described my invention and described in detail the preferred embodiment thereof, I claim and desire to secure by Letters Patent:

1. A diffusion cell comprising a diffusion gel layer and means for retaining reactant liquids in contact with a surface of said layer, said means defining a circular channel for one of said reactants and also defining a well surrounded by said channel for the other of said reactants.

2. An immuno diffusion cell comprising a flat basemember, a gel layer supported on said base member and a template overlying and contacting said gel layer, said template being formed with a circular channel adjacent said gel layer defining therewith an open annulus adapted to retain a first liquid reactant in contact with said gel layer and also being formed with a well surrounded by and eccentric of said channel adjacent said gel layer and adapted to retain a second liquid reactant in contact with said gel layer.

* * * * *